United States Patent
Reed

[11] Patent Number: 5,973,907
[45] Date of Patent: Oct. 26, 1999

[54] MULTIPLE ELEMENT CAPACITOR

[75] Inventor: Erik K. Reed, Mauldin, S.C.

[73] Assignee: Kemet Electronics Corp., Greenville, S.C.

[21] Appl. No.: 08/923,929

[22] Filed: Sep. 5, 1997

[51] Int. Cl.⁶ .............................. H01G 4/228; H01G 4/38
[52] U.S. Cl. ......................................... 361/306.1; 361/328
[58] Field of Search ........................... 361/306.1, 306.3, 361/311–313, 321.1–321.3, 321.4, 321.5, 508–510, 515, 517, 519, 528, 529, 535, 537, 540, 328, 541

[56] References Cited

U.S. PATENT DOCUMENTS

| | | | |
|---|---|---|---|
| 3,686,535 | 8/1972 | Piper | 261/529 |
| 5,010,443 | 4/1991 | Piper | 361/529 |
| 5,198,968 | 3/1993 | Galvagni | 361/529 |
| 5,561,587 | 10/1996 | Sanada | 361/306.1 |
| 5,599,757 | 2/1997 | Wilson et al. | 501/137 |
| 5,600,533 | 2/1997 | Sano et al. | 361/321.4 |
| 5,734,545 | 3/1998 | Sano et al. | 361/321.4 |

*Primary Examiner*—Hyung-Sub Sough
*Assistant Examiner*—Anthony Dinkins
*Attorney, Agent, or Firm*—Banner & Witcoff, Ltd.

[57] ABSTRACT

Multielement capacitors have at least one metal capacitor and at least one ceramic capacitor with common terminals in a common case. The preferred metal capacitance elements have an effective series capacitance of at least 1 microfarad at frequencies of up to 100 kHz. The individual metallic capacitance elements exhibit an ESR of less than 100 milliohms at 100 kHz and a dissipation factor (DF) of less than about 6% at 120 Hz. The ceramic capacitance elements useful in the invention have an equivalent series capacitance of at least about 0.1 microfarads at frequencies of up to about 100 MHz. The individual ceramic capacitance elements have an ESR of less than 20 milliohms at 1 MHz and a dissipation factor of less than 10% at 1 kHz.

11 Claims, 2 Drawing Sheets

MULTIPLE ELEMENT CAPACITOR

FIELD OF THE INVENTION

The invention relates to a capacitor assembly containing at least one ceramic capacitance element and at least one tantalum capacitance element in a common case with common terminals for enhanced high frequency performance. The multiple capacitance elements exhibit a lower high frequency impedance and equivalent series resistance (ESR) over a broader range of frequencies than either type of capacitance element alone combined with the savings associated with a single mounting operation.

BACKGROUND OF THE INVENTION

The development of higher speed microprocessor chips and the miniaturization of the power conversion circuitry (usually switch-mode supplies) used to power these chips have lead to an increase in the demand for small footprint, low ESR capacitors. These capacitors need to minimize voltage output fluctuations at the switching frequency and harmonics of the power supply. They also are used to provide local power to the microprocessor chip to maintain power supply voltages at acceptable limits as the current demands of the processor shift.

Power supplies operating at switching frequencies of 100 kHz and above are one such type of device. It is important that the capacitor exhibit low impedance and equivalent series resistance (ESR) at these frequencies as well as low equivalent series inductance (ESL). The capacitors used in such power supplies should have large low frequency charge storage so the power supply can experience momentary variations in input power without disturbing the output.

Previously, electronics manufacturers have used combinations of metal oxide and ceramic capacitors that are mounted in parallel and connected by a variety of connection circuits to provide charge storage and acceptable high frequency impedance/ESR performance. Unfortunately, the available space for mounting such systems of chips is diminishing as manufacturers design ever smaller and more efficient systems. Manufacturers must also incur costs per mounted connection to assemble such circuits, and variations in the interconnecting circuitry cause differences in the resulting ESL between board manufacturers.

It would be advantageous to have a capacitor element with low impedance and ESR at high frequencies that could be mounted in a minimum amount of space on a circuit board.

It would also be beneficial to have a means for reducing variations in ESL for parallel mounted metal oxide and ceramic capacitors.

SUMMARY OF THE INVENTION

It is an objective of the invention to provide a capacitor element having low impedance and ESR at high frequencies with good low frequency charge storage in a compact assembly.

It is another objective to provide a means for reducing variations in ESL for parallel mounted metal oxide and ceramic capacitors.

In accordance with these and other objectives of the invention that will become apparent from the description herein, a capacitor according to the invention includes: a multielement capacitance assembly that includes at least one metal oxide capacitor element and at least one ceramic capacitance element having common terminals in a common case.

Capacitors according to the invention provide improved performance over the metal oxide capacitor elements alone at frequencies of 1 MHz and higher, provide a compact shape that reduces the number of board connections, and minimize the intercapacitor connection distance to form a capacitor with consistent ESL characteristics. Multielement capacitors of the invention minimize power supply output voltage fluctuations, thereby improving the logic error rate of dependent circuitry, such as a microprocessor and, thus, improve overall system stability. The reduced capacitor spacing and uniform intercapacitor connection design also improves the system's transient response time, reduces power supply noise, and allows the use of fewer capacitance elements to provide a given stability over specified temperature and voltage fluctuation ranges. Assembly of metal oxide and ceramic capacitance elements under uniformly controlled factory conditions enhances reliability by reducing damage (e.g, thermal shock cracking and/or flex cracking) to the ceramic capacitor elements during board assembly.

DETAILED DESCRIPTION

Figure 1:
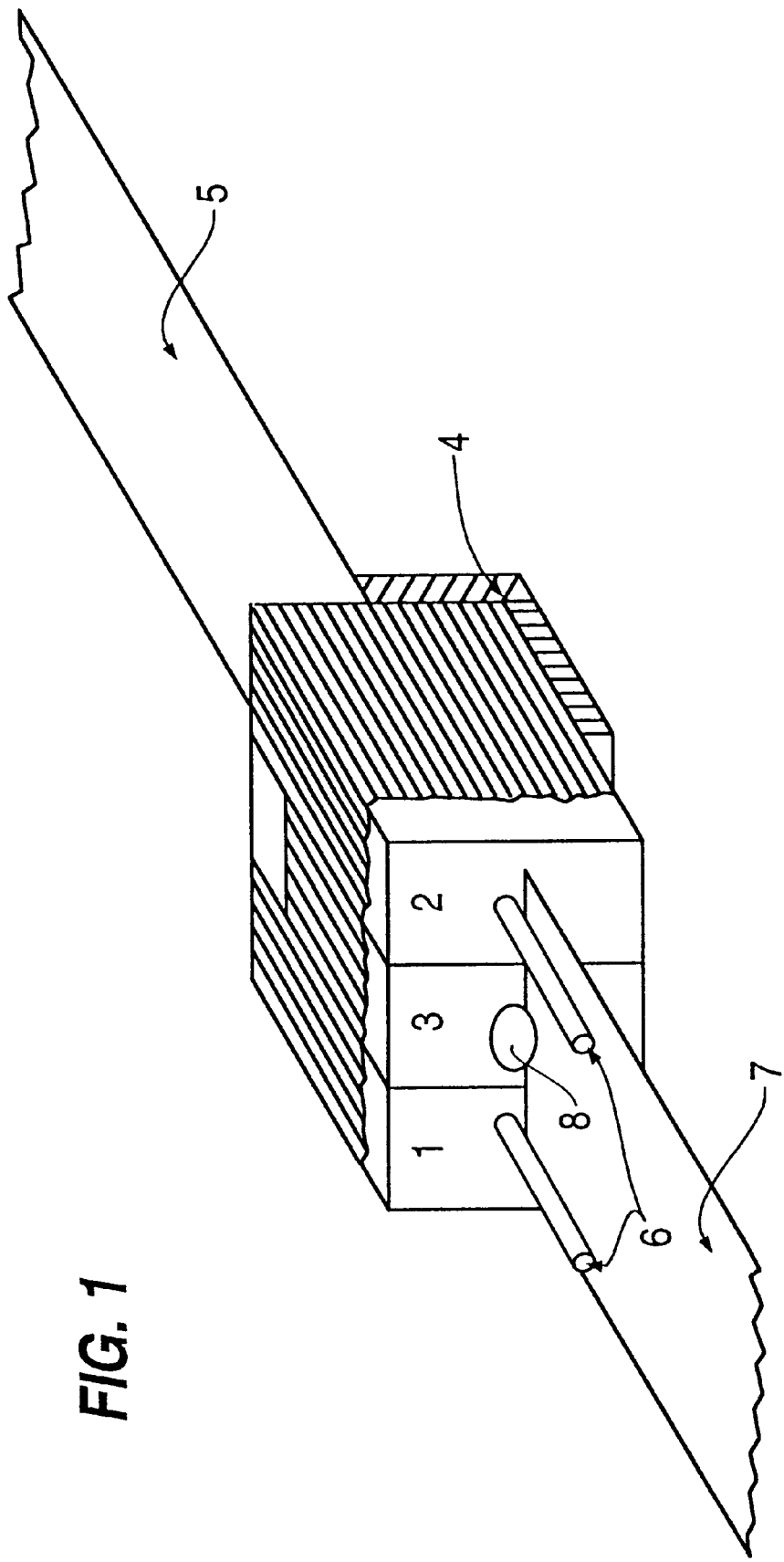
FIG. 1 is a sketch of one arrangement of a multiple element capacitor according to the invention.

Multiple element capacitors according to the invention are made with at least one metallic capacitance element and at least one ceramic capacitance element with common leads in a common case. The preferred assembly includes 1–5 metal oxide capacitance elements and 1–5 ceramic capacitance elements. A particularly preferred combination includes tantalum anode capacitance elements on opposite sides of a ceramic capacitance element.

The preferred metal capacitance elements used in the present invention are selected from among the various metallic capacitance elements that have an effective series capacitance of at least 1 microfarad at frequencies of up to 100 kHz whose individual elements exhibit an ESR of less than 100 milliohms at 100 kHz and a dissipation factor (DF) of less than about 6% at 120 Hz. The equivalent series capacitance of these elements is diminished to a point below useful levels at frequencies of about 1 MHz and higher due to high resistance of internal connections between the dielectric material and the electrodes. The preferred metal oxide capacitance elements include capacitance elements made from commercially available tantalum and aluminum metals. See Piper U.S. Pat. No. 3,686,535 the disclosure of which is herein incorporated by reference.

The ceramic capacitance elements useful in the invention have an equivalent series capacitance of at least about 0.1 microfarads at frequencies of up to about 100 MHz. The individual elements have an ESR of less than 20 milliohms at 1 MHz and a dissipation factor of less than 10% at 1 kHz. These elements generally hold their capacitance at frequencies of up to about 100 MHz. Such capacitance elements are typically made with one or more layers of a ceramic dielectric material having at least one positive and negative electrode. The ceramic capacitance elements useful in the invention can be made from a variety of compositions with a variety of different configurations. See generally, Sanada U.S. Pat. No. 5,561,587; Sano U.S. Pat. No. 5,600,533; and Wilson et al. U.S. Pat. No. 5,599,757 the disclosures of which are herein incorporated by reference. The preferred ceramic capacitance element for use in the present invention is a multilayer ceramic capacitance element made from a dielectric having X7R temperature characteristics (EIA standard).

The capacitance elements may or may not be connected prior to attachment to the negative terminal. For example, the elements may be electrically connected with a conductive material and then attached to a terminal, connected directly to a terminal without interconnection, or interconnected in a manner that the interconnection itself forms the terminal. These connections preferably are made with an electrically conductive material, such as solder or a metal filled adhesive like silver, copper, or nickel-filled epoxy.

Connection of the positive electrodes can be performed with capacitive discharge welding to the positive end of an appropriate leadframe. The resulting device is then enclosed in a suitable case, typically made of metal, molded epoxy, or other conformable plastic material.

The multielement capacitor of the invention uses a common case and terminals with capacitance elements disposed in a variety of possible configurations. Terminals can be formed in a number of methods including electroless plating, sputter coating, and/or condensation of evaporated metal. One possible configuration is shown in FIG. 1 in which metal oxide capacitance elements 1,2 are disposed on opposite sides of ceramic capacitance element 3. Conductive adhesive 4 provides an electrically conductive common connection to negative terminal leadframe 5. Positive leadwires 6 are preferably welded or otherwise permanently attached to positive leadframe 7. The ceramic capacitance element 3 can be directly or indirectly attached to leadframe 7 by a variety of methods, such as electrically conductive material 8 or via a nailhead lead (not shown). The entire assembly can then be sealed within a suitable common housing (not shown) made from metal, resin, or conforming plastic.

There are a number of advantages that attend the multielement capacitors of the present invention. Notably, the multielement capacitor assembly:

- minimizes voltage fluctuations across the capacitance elements thereby minimizing the transient-caused logic error rate of a dependent microprocessor or other dependent circuitry,
- reduces the overall cost of product assembly by eliminating the additional costs, estimated to be about 4–5 times the cost of the ceramic capacitance elements, that are associated with mounting ceramic capacitance elements,
- is volumetrically efficient by physically integrating metal and ceramic capacitors in the same physical case and eliminating the space needed between board connections for the extra casing thicknesses,
- improves the performance of the final system by eliminating irregularities and differences in the inductance of the capacitor interconnections on the circuit board, and
- reduces the risk of ceramic capacitor damage due to thermal stresses routinely encountered in field soldering.

The multielement capacitors of the invention can be used in a variety of products and systems including computer power supplies, general purpose switch-mode power supplies, and local charge storage and high frequency bypass applications at the board level away from the main power supply. Such applications cover a range of applications from motion control and communications systems to logic and computer systems. The locations and connections for such applications are readily determined by an electrical engineer with the existing level of skill in this art.

EXAMPLE

Figure 2:
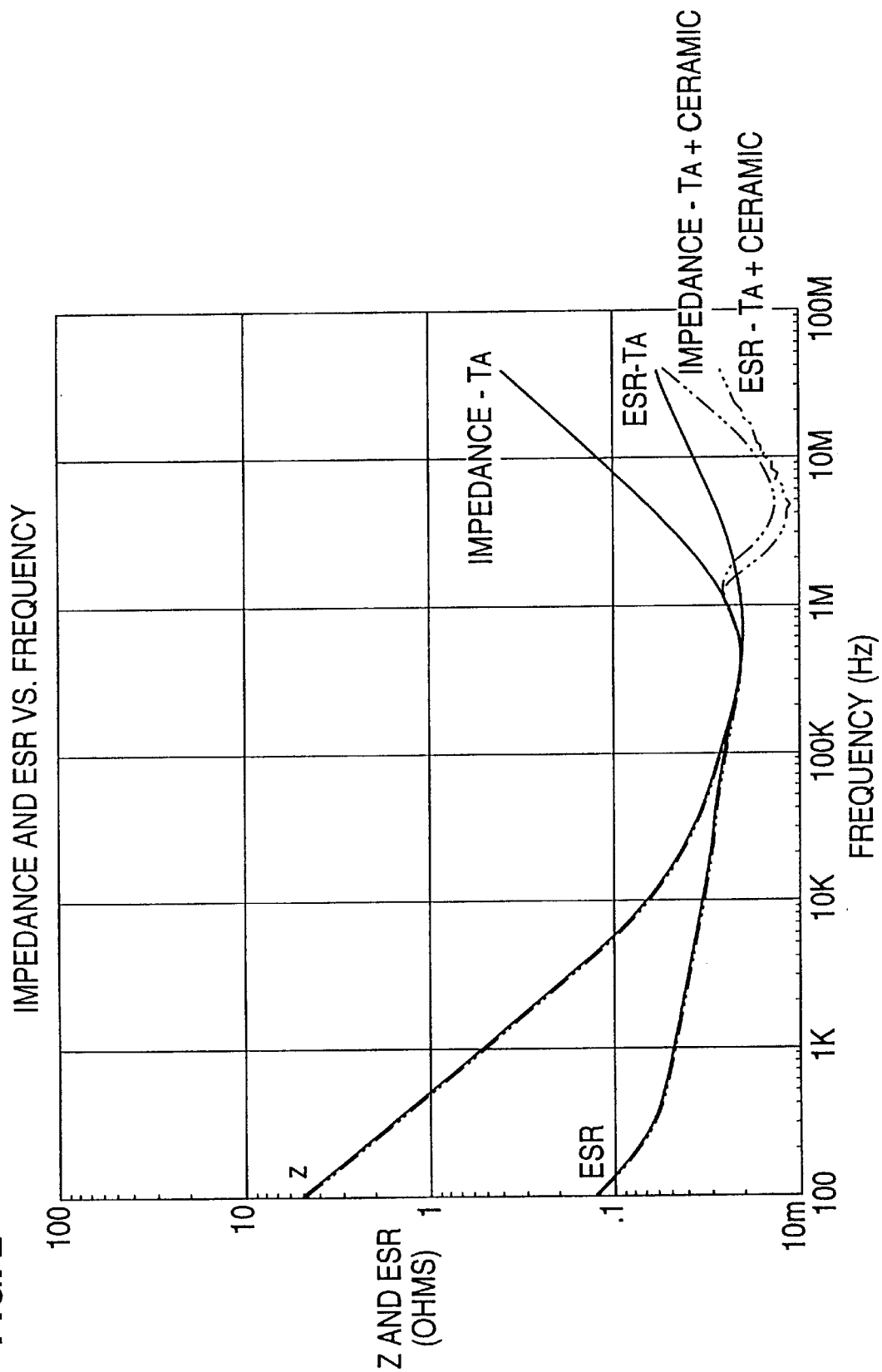
FIG. 2 is a graph illustrating the enhanced impedance and ESR performance of the multiple element capacitor of the invention compared to the performance of a typical prior art tantalum capacitor element.

A multielement capacitor assembly having two tantalum capacitance elements and a ceramic capacitance element are arranged with tantalum elements on either side of a centrally located ceramic element as shown in FIG. 1. Silver-filled epoxy is used to secure each element to the negative terminal. The assembly is tested for ESR and impedance at a variety of frequencies against the properties of two tantalum capacitor elements that do not include a ceramic capacitance element. A graph of the results appears as FIG. 2.

Inspection of the graph will show a large improvement in performance at just beyond 1 MHz with optimum improvement between 2–10 MHz. Circuit analysis indicates that the improvement will persist up to at least 100 MHz. Specifically, the addition of the ceramic element to the casing with two tantalum capacitor elements improved the impedance of the combination by almost an order of magnitude at 10 MHz and improves the ESR by a factor of 3–4 at that frequency compared to the impedance of two tantalum capacitor elements without the ceramic capacitor element.

It will be understood that the example and figures presented herein are intended to facilitate an understanding of the invention and are not intended to serve as limitations on the scope of the appended claims.

I claim:

1. A multielement capacitor assembly comprising at least one metallic capacitance element and at least one ceramic capacitance element having common terminals in a common case.

2. A capacitor assembly according to claim 1 comprising at least one tantalum capacitance element.

3. A capacitor assembly according to claim 1 comprising tantalum capacitance elements disposed on opposite sides of said ceramic capacitance element.

4. A capacitor assembly according to claim 1 wherein negative poles of said capacitance elements are electrically connected with a conductive material.

5. A capacitor assembly according to claim 4 wherein said conductive material comprises silver-filled epoxy.

6. A capacitor assembly according to claim 4 wherein said conductive material comprises solder.

7. A capacitor assembly according to claim 1 exhibiting an equivalent series resistance at 3 MHZ that is less than an equivalent series resistance of said at least one metallic capacitance element alone.

8. A capacitor assembly according to claim 1 exhibiting an impedance at 3 MHZ that is less than an impedance of said at least one metallic capacitance element alone.

9. A capacitor assembly according to claim 1 wherein said capacitance elements are connected together and to a common terminal.

10. A capacitor assembly according to claim 1 wherein said capacitance elements are connected to a common terminal and not otherwise electrically interconnected.

11. A capacitor assembly according to claim 1 wherein a common terminal electrically interconnects said capacitance elements.

* * * * *